(12) United States Patent
Park

(10) Patent No.: US 9,007,735 B2
(45) Date of Patent: Apr. 14, 2015

(54) FAULT DETECTION, ISOLATION, LOCATION AND RECONNECTION SYSTEMS AND METHODS

(71) Applicant: The Regents of the University of Colorado, a body corporate, Denver, CO (US)

(72) Inventor: Jae-Do Park, Highlands Ranch, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 138 days.

(21) Appl. No.: 13/836,867

(22) Filed: Mar. 15, 2013

(65) Prior Publication Data
US 2013/0286521 A1    Oct. 31, 2013

Related U.S. Application Data

(60) Provisional application No. 61/639,766, filed on Apr. 27, 2012, provisional application No. 61/745,031, filed on Dec. 21, 2012, provisional application No. 61/778,235, filed on Mar. 12, 2013.

(51) Int. Cl.
*H02H 7/26*    (2006.01)
*H02H 3/06*    (2006.01)

(52) U.S. Cl.
CPC ............... *H02H 3/066* (2013.01); *H02H 7/268* (2013.01)

(58) Field of Classification Search
CPC ....................................................... H02H 3/066
USPC ........................................................... 361/57
See application file for complete search history.

(56) References Cited

U.S. PATENT DOCUMENTS

| | | | |
|---|---|---|---|
| 6,448,671 B1* | 9/2002 | Wallace et al. | 307/10.1 |
| 2011/0260779 A1* | 10/2011 | Liu | 327/520 |
| 2013/0041516 A1* | 2/2013 | Rockenfeller et al. | 700/287 |

* cited by examiner

*Primary Examiner* — Thienvu Tran
*Assistant Examiner* — Tien Mai
(74) *Attorney, Agent, or Firm* — Snell & Wilmer L.L.P.

(57) ABSTRACT

In an example embodiment, systems and methods for detecting and handling faults in a DC bus system ("system") can comprise detecting a fault in the segment, isolating the segment from the system, waiting for a period of time, connecting a probe power unit to the system at the isolated segment, and determining if a fault still exists on the isolated segment, wherein the determining is based on whether power is discharging from the probe power unit when connected to the system. The system can comprise one or more controllers and a probe power unit.

17 Claims, 11 Drawing Sheets

FAULT DETECTION, ISOLATION, LOCATION AND RECONNECTION SYSTEMS AND METHODS

CROSS-REFERENCE TO RELATED APPLICATIONS

This application claims priority to U.S. Provisional Application No. 61/639,766, entitled "Fault Detection and Isolation in Low Voltage DC Bus Microgrid System," which was filed on Apr. 2, 2012, and U.S. Provisional Application No. 61/745,031, entitled "Fault Location Method Using a Power Probe Unit," which was filed on Dec. 21, 2012, and U.S. Provisional Application No. 61/778,235, entitled "Fault Location Method Using a Power Probe Unit," which was filed on Mar. 12, 2013, the contents of which are hereby incorporated by reference for any purpose in their entirety.

FIELD OF THE INVENTION

This disclosure is related to power systems, and more particularly to systems and methods for detecting a fault, isolating a faulted segment, testing to determine if the fault remains, finding the location of the fault, and reconnecting the segment of the electrical power system if the fault is removed.

BACKGROUND

In power distribution systems in general (i.e., alternating current/direct current ("AC/DC") systems), and more particularly, in DC microgrid systems, it is common to isolate faulted lines in the event that a fault is detected. Such systems typically wait a period of time and then reconnect to see if the fault has been fixed. If after a number of attempted reconnections, the fault still exists, the system can be configured to shut down until the fault can be identified and fixed.

Protection of DC systems can be challenging because it is more difficult to interrupt the fault current in a DC system. It is also difficult to exactly locate the fault in a DC system. Moreover, repetitive reconnection attempts can present safety issues, can potentially damage expensive equipment, and can waste electric power. It is desirable to develop new protection schemes with fault detection, isolation, location, testing, and reconnection capabilities.

SUMMARY OF THE INVENTION

In an example embodiment, a fault protection system for use in a DC bus system ("system"). The system can further comprise energy sources, energy loads, and energy storage (each a distributed element and collectively distributed elements), all in a DC power transmission or distribution system. In an example embodiment, a first element can be connected to a system at a first node, and a second element can be connected to the system at a second node. In an example embodiment, a portion of the system between the first node and the second node is a segment. In an example embodiment, the fault protection system can comprise a fault detection system configured to detect a fault in the segment; and a controller system configured to control switches to isolate the segment, wherein the switches can be bus switches and free-wheeling switches; wherein isolating the segment does not disconnect multiple distributed elements from the system.

Furthermore, a method of detecting and handling faults in a DC bus system ("system") can comprise detecting a fault in the segment, isolating the segment from the system, waiting for a period of time, connecting a probe power unit to the system at the isolated segment, and determining if a fault still exists on the isolated segment, wherein the determining is based on whether power is discharging from the probe power unit when connected to the system.

Furthermore, a fault protection system for use in a DC bus system ("system"), can comprise: a controller configured to detect a fault in the segment and to isolate the segment; and a probe power unit configured to determine, while the segment is isolated, if the fault still exists, wherein the probe power unit is configured to be selectively connected to the segment while the segment is isolated, and wherein the controller is configured to reconnect the segment to the system based on information from the probe power unit indicating that the fault does not exist.

BRIEF DESCRIPTION OF THE DRAWING FIGURES

A more complete understanding of the present invention may be derived by referring to the detailed description when considered in connection with the appendix materials and drawing figures, wherein like reference numbers refer to similar elements throughout the drawing figures, and:

DETAILED DESCRIPTION

While exemplary embodiments are described herein in sufficient detail to enable those skilled in the art to practice the invention, it should be understood that other embodiments may be realized and that logical electrical and mechanical changes may be made without departing from the spirit and scope of the invention. Thus, the following detailed description is presented for purposes of illustration only.

In accordance with an example embodiment, a system and method are disclosed for detecting and interrupting a fault on a segment of an electric power system, safely determining when the segment can be reconnected to the electric power system, and identifying the fault location.

Figure 1:
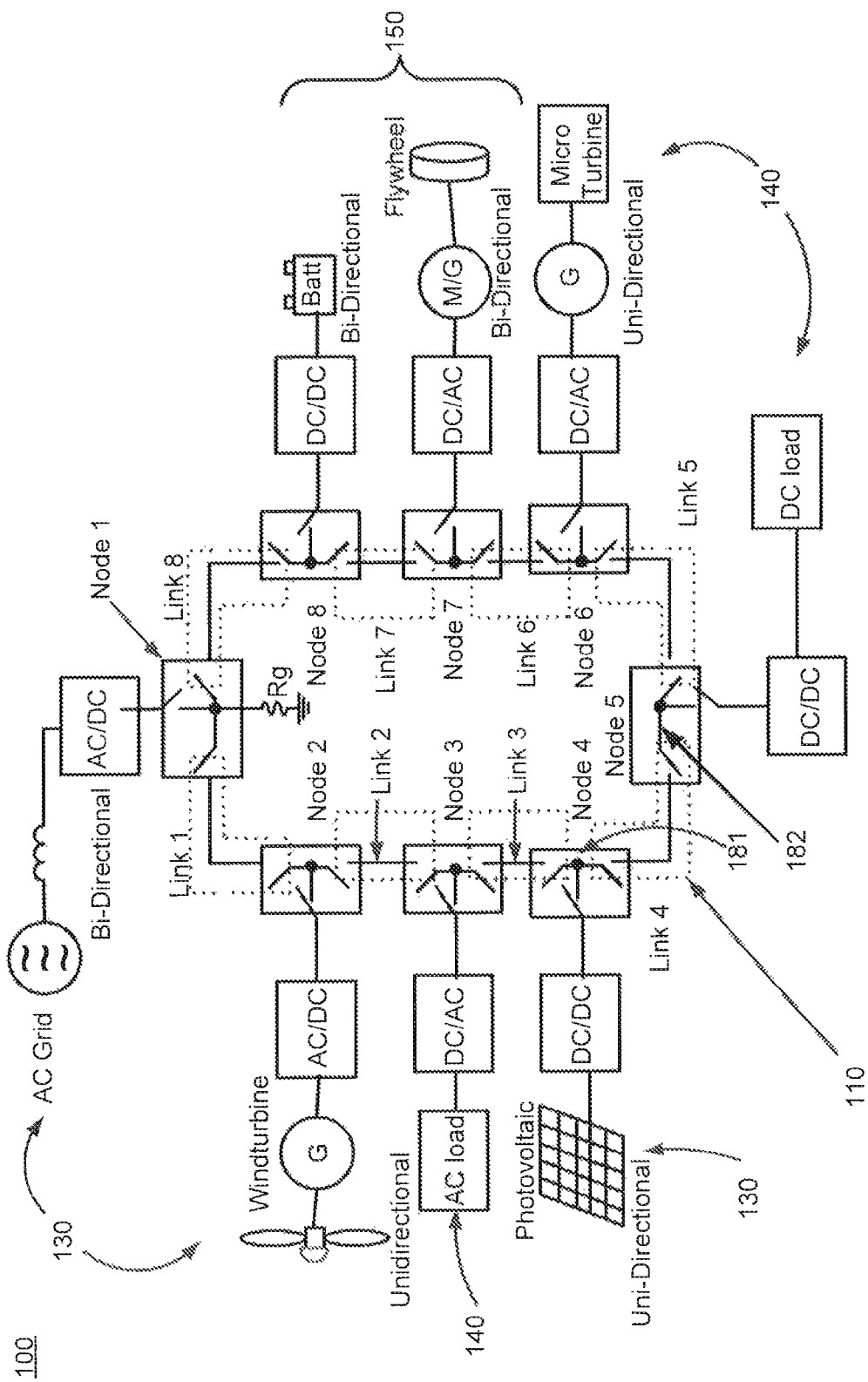
FIG. 1 illustrates a block diagram of a low voltage DC bus microgrid system, in accordance with various embodiments.

Although principles herein may apply in some instances to both AC and DC electrical systems, this disclosure is prepared in the context of a low voltage DC bus microgrid system. The DC bus microgrid system is distinguished from an AC bus microgrid system depending on the component systems (e.g., energy sources, loads, and storages) connected thereto. In other words, an AC bus microgrid system connects to attached components via AC power, and a DC bus microgrid system connects to attached components via DC power. Moreover, the principles discussed herein can have applicability to both microgrid and macrogrid embodiments. A microgrid is typically a smaller power system, often associated with a building, small town/city, or an island. With reference now to FIG. 1, an example DC microgrid system is illustrated. Although some of the connected components are AC components, each connects to the DC microgrid system via DC power and various AC/DC and DC/DC power converters can be used for this purpose.

A low voltage DC bus microgrid system (hereinafter, "microgrid system") can be particularly useful in renewable energy applications such as wind turbines and photovoltaic systems. Such systems are useful in distributed load, storage and generation applications. A microgrid system can be a small scale distributed power system. With reference now to FIG. 1, a microgrid system 100 can comprise loads 140, energy storage 150, and energy sources 130.

In an example embodiment, loads 140 can comprise: an AC load and a micro turbine (both connected to the grid via an AC/DC power converter); and a DC load (connected to the grid via a DC/DC power converter). In an example embodiment, energy storage 150 can comprise: batteries (connected to the grid via a DC/DC power converter); and flywheels (connected to the grid via a DC/AC power converter). In an example embodiment, energy sources 130 can comprise: AC power from traditional power grids (connected to the microgrid via an AC/DC power converter); a wind turbine (connected to the microgrid via an AC/DC power converter); and a photovoltaic source (connected to the microgrid via a DC/DC power converter). Moreover any suitable sources, storage devices, or loads may be connected to the DC microgrid. The distributed energy sources and/or storage may be configured for bi-directional power flow according to their operating modes: e.g., motoring/regenerating of an inertial load, charge/discharge of energy storage. In other example embodiments, the connected nodes may be configured for uni-directional power flow, e.g., micro turbine power supply to the micro grid.

Each of the distributed energy sources, loads, and storage may be connected to the low voltage DC bus microgrid via an appropriate power electronic converters, e.g., AC/DC or DC/DC converter, such that the power on the microgrid is converted to connect to the DC bus. As used herein, the terms AC/DC and DC/AC are used interchangeably as their purpose is clear from the context and the direction of power flow.

In an example embodiment, the low voltage DC bus microgrid system further comprises distributed energy sources, distributed energy loads, and distributed energy storage. The microgrid system comprises a loop type energy distribution system, wherein more than one path exists from one of the distributed energy sources, loads, or storage to one of the other distributed energy sources, loads, or storage. The microgrid system may be configured to power an industrial complex, town, neighborhood, or building, etc. In various exemplary embodiments, the microgrid system is a standalone system. In other exemplary embodiments, the microgrid system is connected to a traditional AC power grid.

Microgrid 100 may further comprise a fault protection system. With reference to FIG. 1, fault protection system 110 can be located between two nodes (e.g., node 181 and 182) of microgrid 100. Moreover, a fault protection system may exist between each node of microgrid 100. In another example embodiment, a fault protection system can be associated with each node of microgrid 100. At a high level, fault protection system 110 is configured to detect a fault in a segment of microgrid 100 and isolate that segment of the microgrid.

Figure 2:
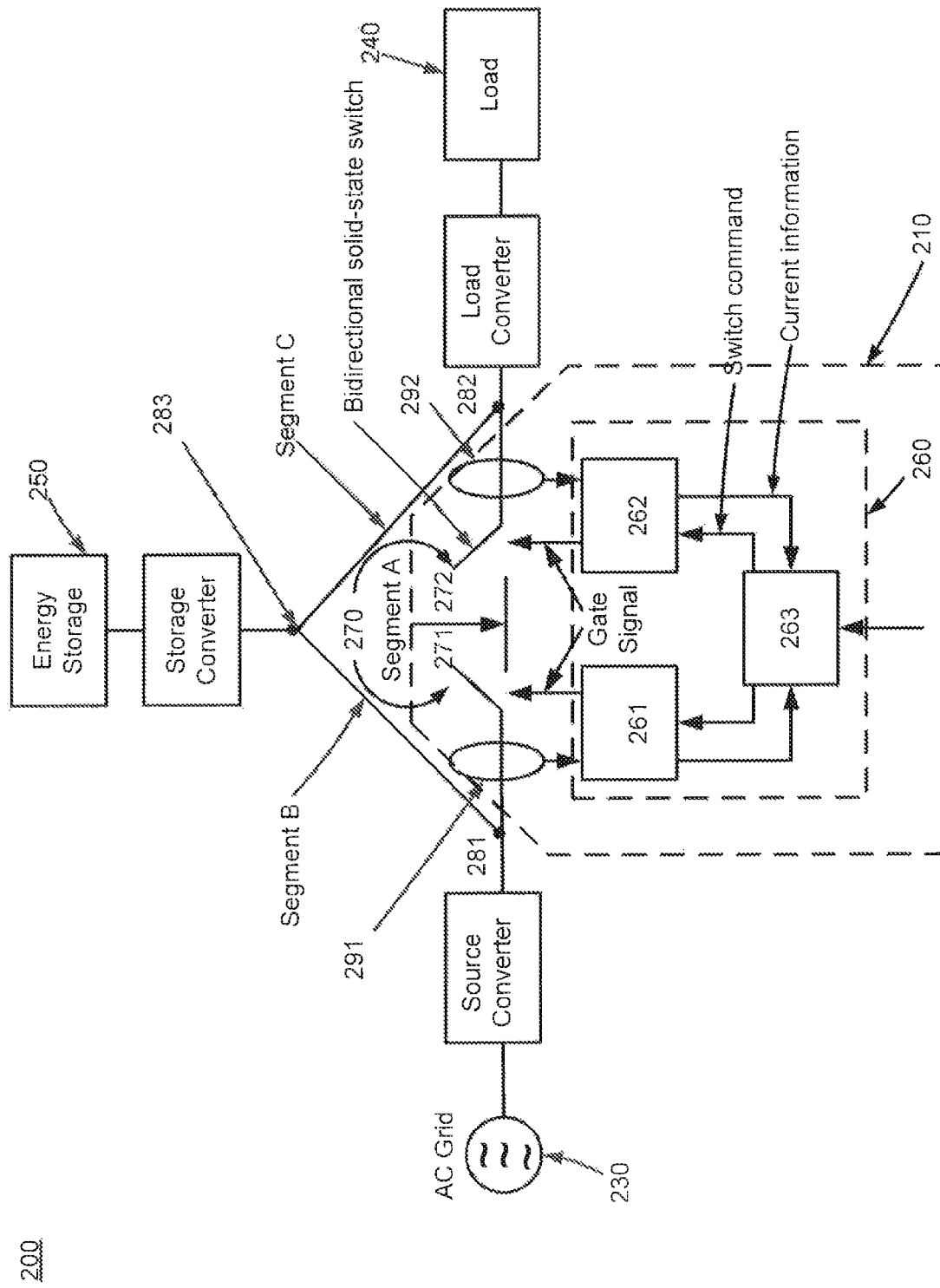
FIG. 2 illustrates a block diagram of another, simpler, low voltage DC bus microgrid system, in accordance with various embodiments.

With reference now to FIG. 2, an example, simplified, low voltage DC bus microgrid system 200 is illustrated. Microgrid 200 comprises a source 230, load 240, and energy storage 250, each connected through a respective converter to nodes 281, 282, and 283. Nodes 283 and 281 can be connected to each other via segment B. Nodes 281 and 282 can be connected to each other via segment A. Nodes 282 and 283 can be connected to each other via segment C. In this simplified example, a fault detection and isolation system 210 can be configured to detect, on segment A, a line-to-ground fault and a line-to-line fault and to isolate those faults without shutting down the entire system. Additional fault protection systems, not shown but similarly constituted, can be associated with segment B and segment C.

A fault detection and isolation system can comprise a fault detection portion and a controller. The fault detection portion can be configured to detect a fault in a segment of the microgrid system. The controller can be configured to control switches to isolate the faulted segment of the microgrid system. The fault detection and isolation system 210 can comprise a fault detection portion (e.g. sensors 291/292) configured to detect a fault in a segment (e.g., segment A) of the microgrid system, as well as a controller 260 configured to control switches 270 to isolate the faulted segment of the microgrid system.

Sensors

In an example embodiment, the fault detection system is configured to detect a fault in a segment (i.e., a faulted segment) of the microgrid system, wherein the segment is located between a first terminal (181, 281) and a second terminal (182, 282) of the microgrid system. The fault detection and isolation system (110, 210) may further comprise first and second sensors 291/292, respectively. Sensors 291/292 may, for example, be current sensors. Sensors 291/292 may output first and second current sensor signals representative of the amount of current sensed by each respective sensor. The first sensor 291 is configured to measure the current passing through the segment at a first end of the segment; for example, near terminal 281. The second sensor 292 is configured to measure the current passing through the segment at a second end of the segment opposite the first end of the segment; for example, near terminal 282. Fault detection and isolation system (110, 210) may be configured to compare the signals from sensors 291/292 and determine if a fault exists. Thus, fault protection system (110, 210) may be configured to determine whether there is a line-to-line fault or a line-to-ground fault. A line-to-line fault occurs when a path between the positive and negative line is created, short-circuiting the two together. A fine-to-ground fault occurs when a path between either the positive or negative pole and ground is created.

Switches

Fault protection system (110, 210) may further be configured to control switches (e.g., switches 270) to isolate the faulted segment of microgrid system 100/200. In one example embodiment, the switches are solid state switches. The switches can further be bidirectional solid-state switches. Example switches include gate turn-off ("GTO"), insulated-gate bipolar transistor ("IGBT") and integrated gate-commutated Thyristor ("IGCT") type switches. The solid state switches can be located on the bus segment and on a freewheeling branch. The switches can be: bus switches and freewheeling switches. In an example embodiment, a bidirectional switch can be used instead of a diode to protect the line-to-line fault in accordance with various embodiments, a freewheeling switch can provide a path for fault current to flow in response to the segment being separated. In various embodiments, the freewheeling switch can be an uncontrolled unidirectional switch or a controlled bi-directional switch. The freewheeling switch can comprise the aforementioned semi-conductor switches and power diode in various embodiments. Without a freewheeling path, the voltage at the line circuit breaker can be destructively high when opening due to the line inductance.

Figure 3:
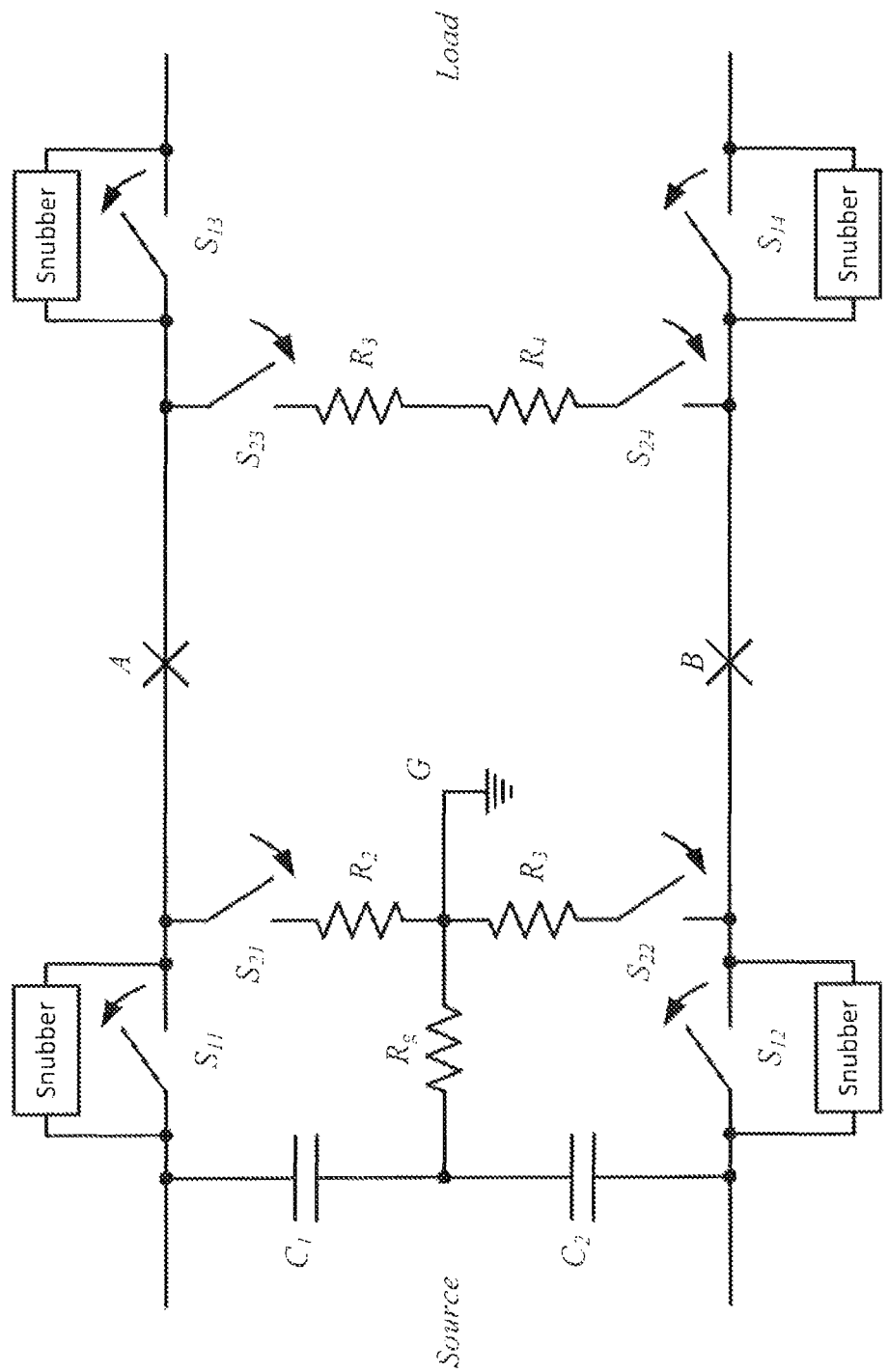
FIG. 3 illustrates various schematics of a switching circuit and/or operation thereof, in accordance with various embodiments.

With reference now to FIGS. 3-4 an example circuit illustrates the switching to isolate the faulted segment. For example, segment A as illustrated in FIG. 3, which can be similar to segment A from FIG. 2, has the bus switches S1$x$ closed during normal operation. When a line-to-ground fault is sensed on segment A, see FIG. 4(a), bus switches S1$x$ of segment A are then opened and freewheeling switches S2$x$ of segment A are simultaneously closed. See FIG. 4(b). Thus, the current flowing in segment A is redirected in a circular path.

Figure 4A:
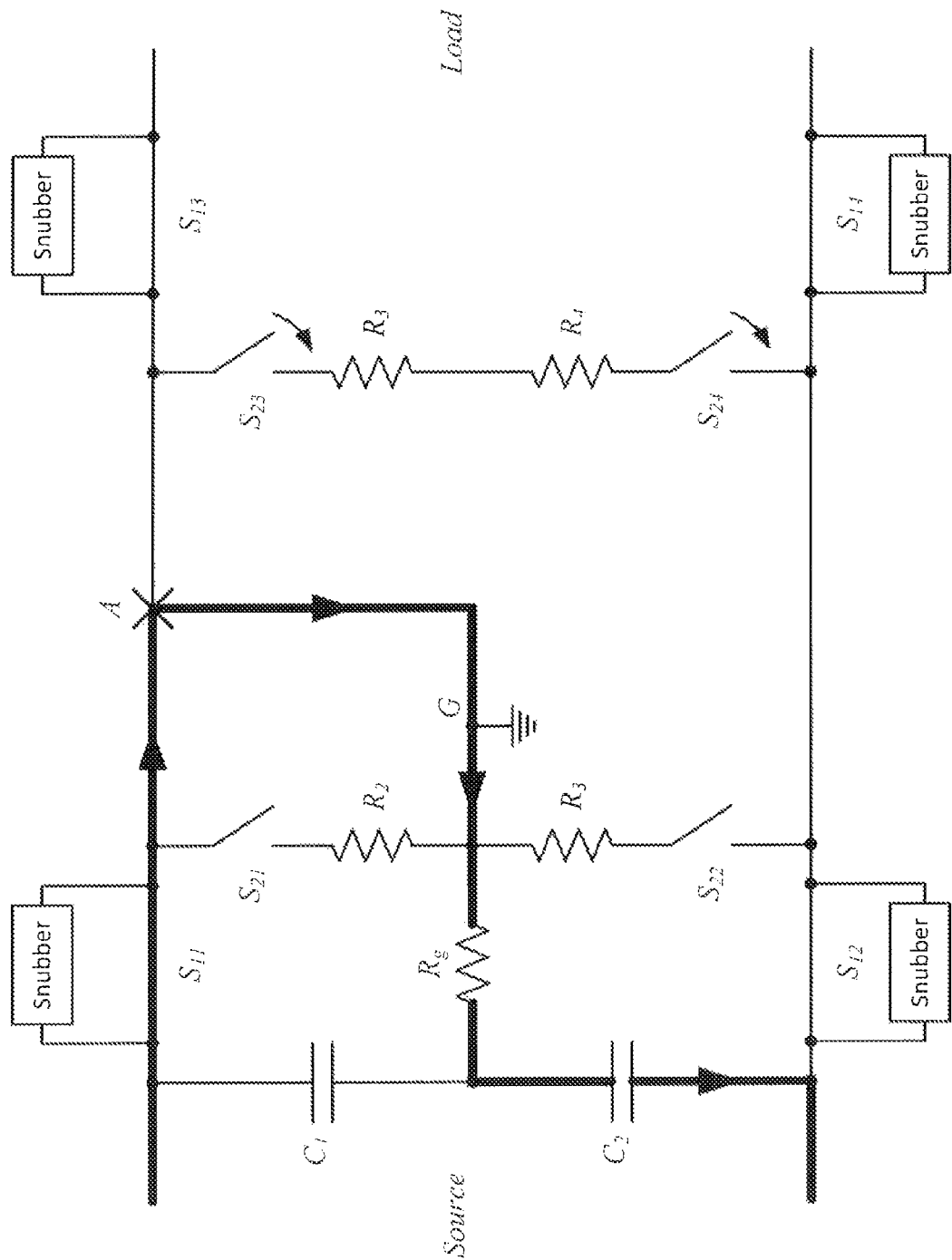
FIG. 4A illustrates various schematics of a switching circuit and/or operation thereof, in a accordance with various embodiments.
Figure 4B:
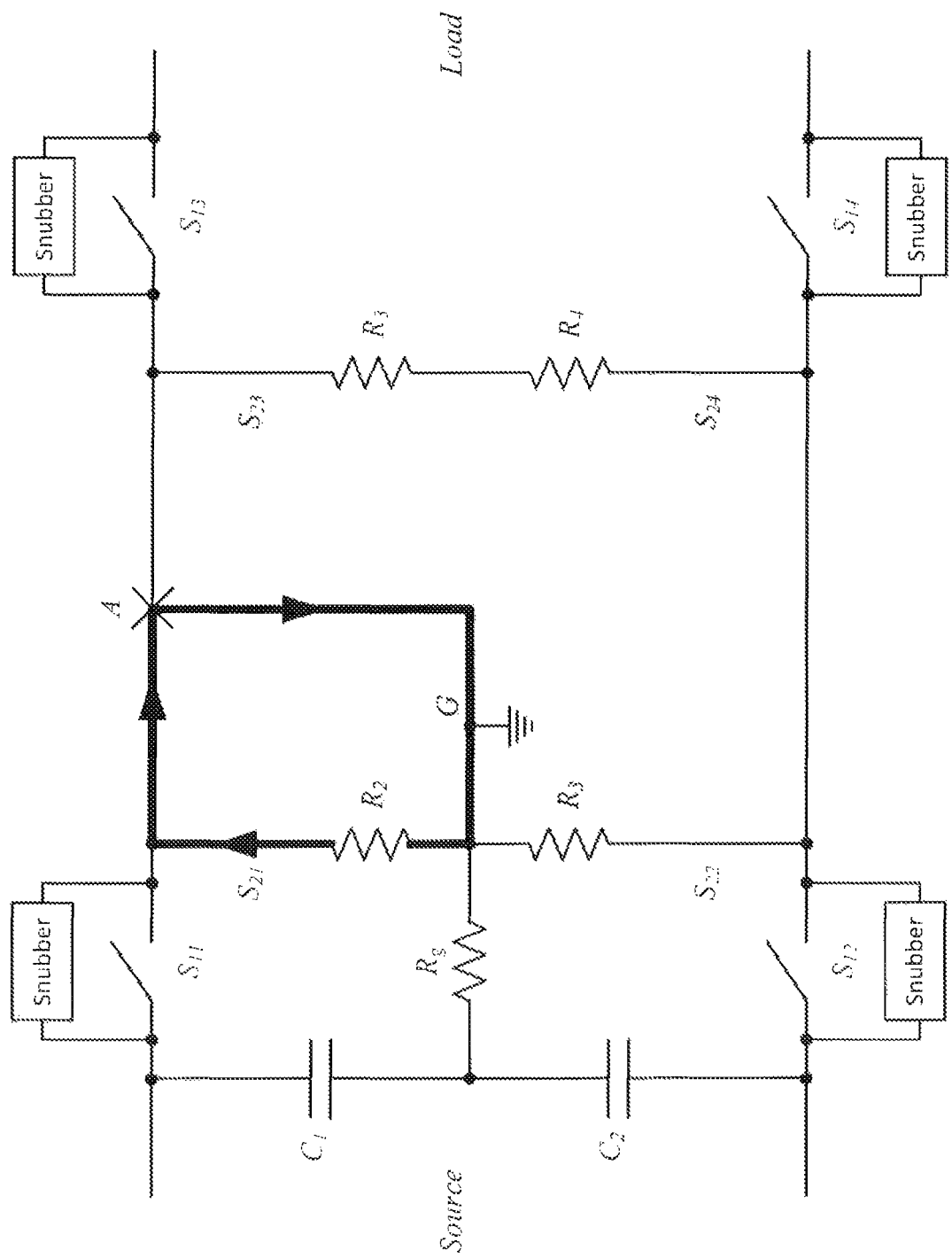
FIG. 4B illustrates various schematics of a switching circuit and/or operation thereof, in accordance with various embodiments.
Figure 4C:
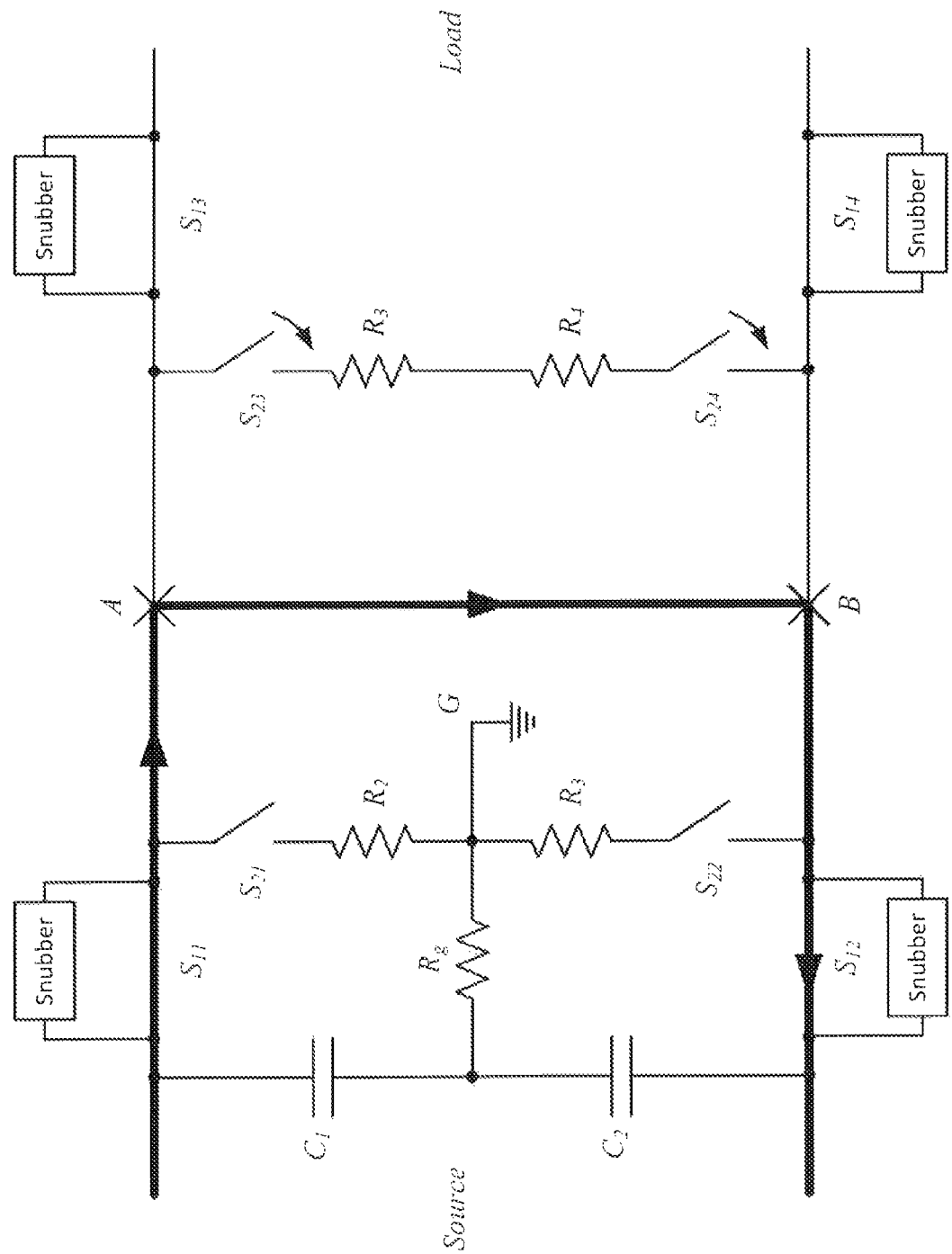
FIG. 4C illustrates various schematics of a switching circuit and/or operation thereof, in accordance with various embodiments.
Figure 4D:
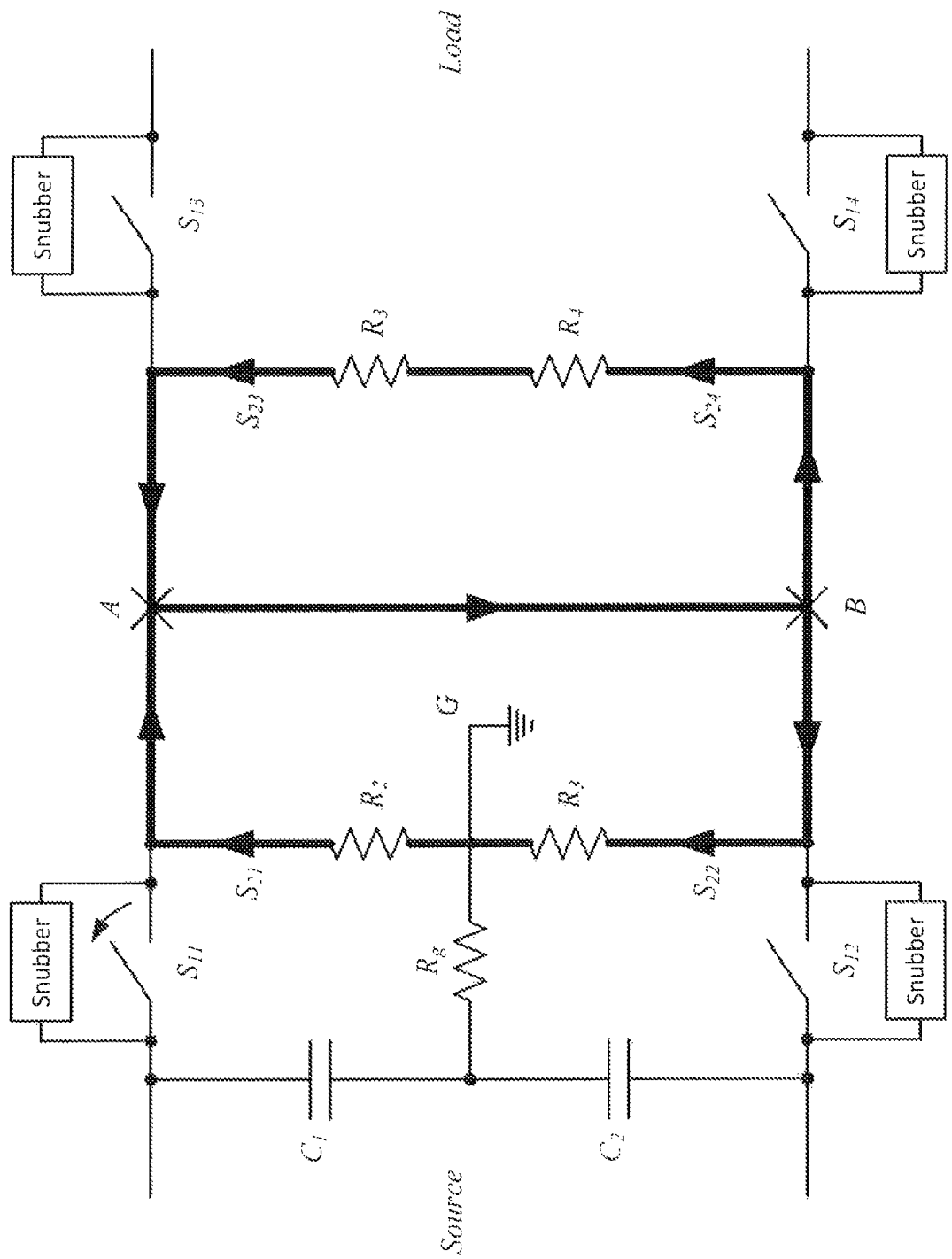
FIG. 4D illustrates various schematics of a switching circuit and/or operation thereof, in accordance with various embodiments.

In another example, with reference to FIGS. 3, 4(c) and 4(d), when a line-to-line fault is sensed on segment A to segment B, see FIG. 4(c), bus switches S1$x$ of segments A and B are then opened and freewheeling switches S2$x$ of segments A and B are simultaneously closed. See FIG. 4(d). Thus, the current flowing in segments A and B is redirected in a circular path. Both of these cases isolate segment A while at the same time reduce arcing making switching more feasible. The S2$x$ freewheeling switches can be configured to form a freewheeling path for fault currents, can be configured to facilitate opening the S1$x$ bus switches without arcing, and can be configured to extinguish the fault current through resistors. Thus, semiconductor-based bidirectional switches S1$x$ and S2$x$ can be used for segment separation and fault current freewheeling, respectively.

The use of DC switches can be advantageous, as they can typically interrupt constant current faster than their AC counterparts to isolate faulted lines. Thus, in an example embodiment no AC circuit breakers are used for system protection from faults in a microgrid. In particular, the switches in the ring-type microgrid are configured such that a single faulted section will not disconnect any connected sources, loads, or storage.

Furthermore, any suitable switching may be used that is configured to redirect current flowing in the microgrid away from the fault. For example, non-solid-state switches may be used. Moreover, any suitable switching may be used that is configured to avoid arcing when opening the switch carrying the DC current at the time of the fault.

Controller

In an example embodiment, controller 260 further comprises a master controller 263. Controller 260 can be configured to detect a fault on the segment by comparing the measured current from the first sensor with the measured current from the second sensor. Moreover, master controller 263 may be configured to detect a fault on the segment by comparing any suitable signals for detection of a fault, where those signals are unique to the relevant segment. Master controller 263 may be further configured to determine whether the fault is a line-to-line fault or a line-to-ground fault. For example, an additional current sensor associated with the ground can be configured to provide an indication of whether the fault is a line-to-line fault or a line-to-ground fault. In an example embodiment, however, the response to isolate the segment is the same for either a line-to-line fault or a line-to-ground fault.

Controller 260 may further comprise first and second slave controllers 261 and 262. First slave controller 261 can be configured to receive a first signal from first sensor 291, pass the first signal to master controller 263, receive switching instructions from master controller 263, and control one or more switches 270 (e.g., switch 271). Similarly, second slave controller 262 can be configured to receive a second signal from second sensor 292, pass it to master controller 263, receive switching instructions from master controller 263, and control one or more of switches 270 (e.g., switch 272).

In one example embodiment, master controller 263 can be configured to receive the first and second signal from first and second slave controllers 261/262 respectively and to compare the first and second signals. Master controller 263 can be configured to command slave controllers 261/262 to switch various switches if a difference exists between the first and second signals (i.e., if a difference exists between the current measured at either end of the segment). In an example embodiment, any significant difference in the measured current may indicate a fault. Moreover the sensitivity can be adjusted as desired.

Multiple Fault Protection Systems

It is noted that there may be multiple segments, i.e., portions of the low voltage DC bus microgrid between terminals, where each terminal connects a distributed source, load, or storage. For each section, a fault detection and isolation system 210 can be used. Thus, in the example represented in FIG. 2, three fault protection systems 210 may be used, though only one is shown. Similarly, with reference to FIG. 1, as many as eight fault protection systems can be used. Moreover, assuming a loop bus system with distributed connected load/source/storage points, where there are N connection point to the bus, there will be N segments. Thus, anywhere from 1 to N fault protection systems may be connected to the microgrid. In these embodiments, if only one segment faults, all the connected points can still be electrically connected with each other. Stated otherwise, isolating a single faulted section of the loop microgrid system does not disconnect any of the distributed energy sources, loads, and storage from each other. Even if multiple segments fault at the same time, those connected points without the faulted segments can still be electrically connected to each other.

Moreover, in various other example embodiments, a single master controller can control the slave controllers for two or more segments of the microgrid. In yet another embodiment, the slave controllers can be configured to communicate with each other and can be configured in a distributed control arrangement with no master controller. In other example embodiments, each fault protection system can work independently of fault protection systems for other segments. In this manner, each fault protection system can be a plug-and-play type device that can be added or removed from segments as desired.

Method

In accordance with an exemplary embodiment, a method of detecting fault and isolating that fault in a low voltage DC bus microgrid system comprises the steps of: sensing the current passing through a segment, on a first end of the segment, of the microgrid system; sensing the current passing through the segment, on a second end of the segment that is opposite the first end of the segment; comparing the currents sensed at the first and second ends; and detecting a fault based a difference between the first and second sensed currents; controlling switches to isolate the segment upon detection of the fault in that segment. The controlling switches step may farther comprise the steps of commanding slave controllers, from a master controller, to control switches to isolate the segment.

In an exemplary embodiment, the fault detection and isolation system is configured to detect a fault and open/close the solid-state breakers in less than 500 microseconds. Other speeds may be used as appropriate.

In an example embodiment, and with momentary reference to FIG. 1, microgrid 100 comprises nodes (e.g., 181 and 182), and links between each node. In this example embodiment, there are eight nodes and eight links, though any suitable number of nodes/links can be used. Each node can be associated with three switches. The first switch can be configured to selectively connect the attached source/load/storage to the microgrid bus. The second and third switches can be configured to selectively connect the node to first and second links of the microgrid bus on either side of the node. In an example embodiment, each link can comprise a portion of the microgrid bus and is bracketed on either end by a node switch.

Although the fault protection system is described above as a controller associated with each link, the same isolation principles can be implemented with a controller associated with each node, assuming proper communication between the controllers. In this regard, and with reference now to FIG. 5, a microgrid bus 500 can comprise a controller 560 and a probe power unit 550. Controller 560 can be an intelligent electronic device.

Controller 560 can be associated with a node of microgrid bus 500. Controller 560 can be configured to receive signals from current sensors 571 and 572. The signals from current sensors 571 and 572 can indicate the magnitude of the current flowing in the microgrid bus 500 at the location of the sensor (i.e., on the left or right arm of the node). In an example embodiment, controller 560 is configured to communicate with other controllers to compare the current flowing through the microgrid bus 500 at its node with the current flowing through the microgrid bus at adjacent nodes. In the event that the current flowing in an adjacent node is different from that flowing through the current node, the intermediate link has a fault and can be isolated by opening the switches associated with that link.

By way of example, if the node 8 controller compares the current on the bottom sensor (sensor 572) with the current flowing past the top sensor of node 7 and finds a significant difference, the link between node 8 and node 7 can be isolated by opening switches B83 and B71 associated with that link. In this example, a fault exists in segment A in the link between nodes 7 and 8. In another example embodiment, controller 560 can be configured to open all three switches associated with its node under various circumstances, e.g., circuit breaker open failure or zone lockout situations. Controller 560 can be configured to send signals to other controllers to cause them to open switches under appropriate circumstances.

In one example embodiment, once a fault is detected and the faulted segment of the microgrid is isolated, controller 560 can attempt to reclose and restore the connection. Often faults are temporary and will clear themselves after a short period of time. Thus, in one example embodiment, controller 560 can be configured to wait a predetermined waiting time and reclose the switches. However, doing so recloses without knowing the status of the fault. Once the circuit is re-closed, the fault detection system can check to see if the fault still exists. If the fault still exists, the system may be configured to open the circuit again. This process can be repeated a desired number of times before the circuit is left open indefinitely to protect the system. Unfortunately, if there is a fault when the circuit is re-closed, a lot of fault current can flow until the circuit is re-opened. This high current flow can be damaging to the system, attached equipment, and/or humans.

Probe Power Unit.

The disclosure herein related to detecting the fault in the first instance and isolating that fault has been directed generally to a DC bus power distribution system, even though that system has been disclosed in the example embodiment of a low voltage DC bus microgrid system. In general, the detecting and isolating system can be a low voltage system, medium voltage system, or high voltage system. In an example embodiment, low voltage can be from approximately 750 Volts to 1500 Volts.

The following disclosure related to detecting the persistence of a fault and its location is also discussed in the context of a low voltage DC bus microgrid system, however the principles apply generally to AC, systems and DC systems, to high, medium, and low voltage systems, and to microgrid and macrogrid systems.

Figure 5:
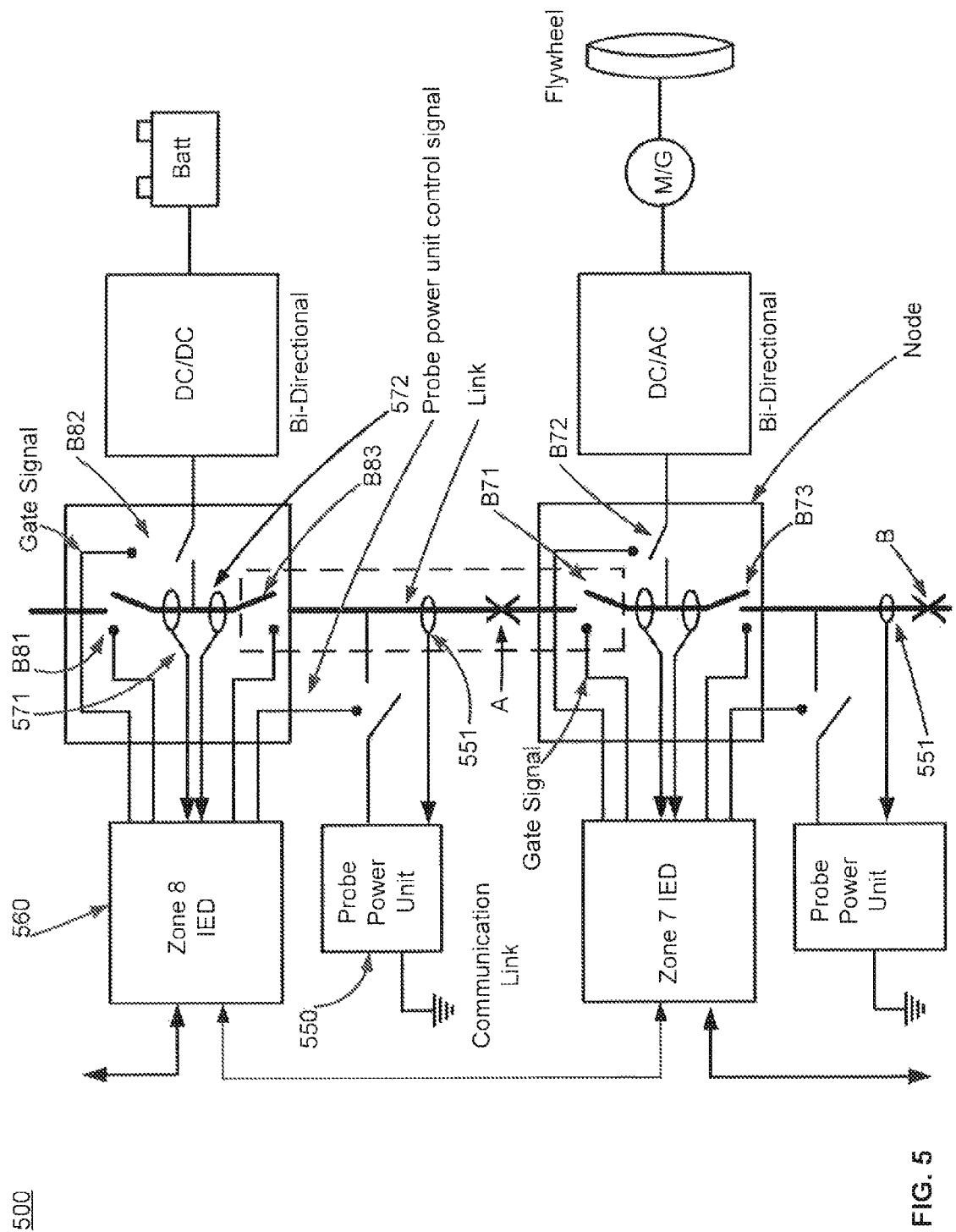
FIG. 5 illustrates a block diagram of an example control system with a probe power unit, illustrated in the context of two nodes.
Figure 6:
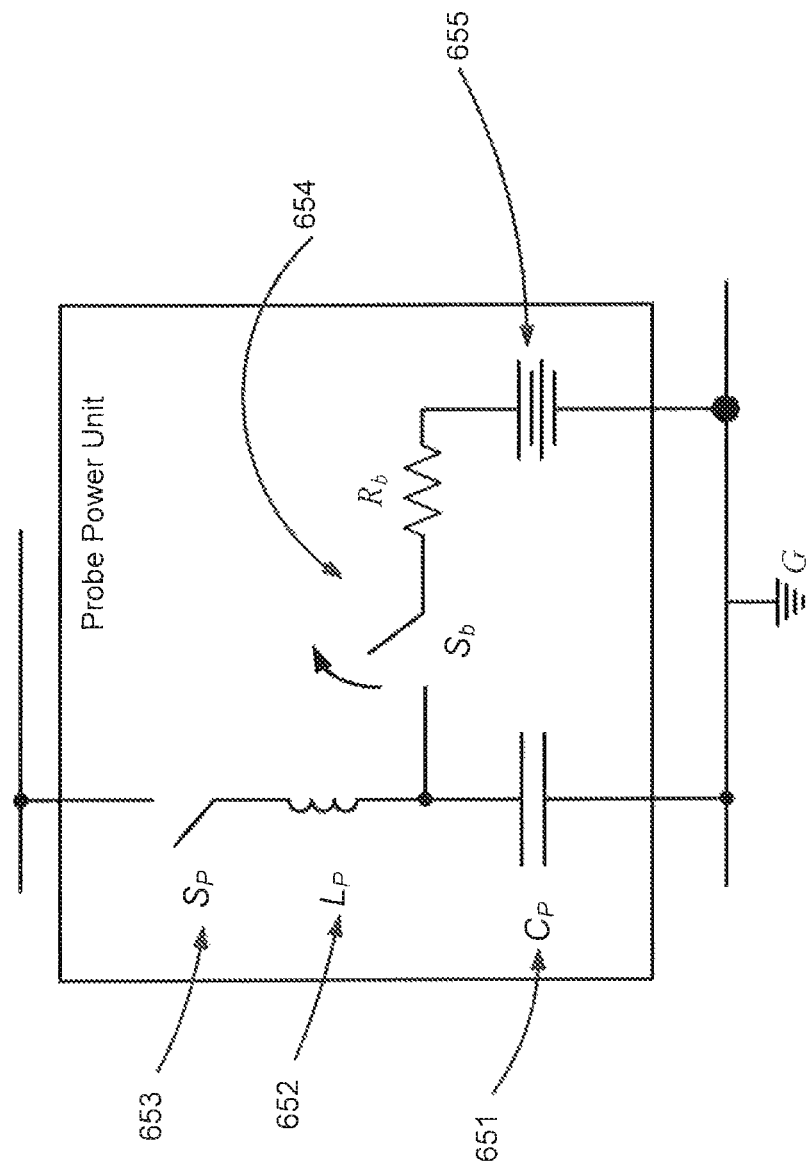
FIG. 6 illustrates an example probe power schematic.

In an example embodiment, the fault protection system is configured to test an isolated segment to see if the fault condition has been eliminated before attempting to reconnect that segment. In particular, a probe power unit may be configured to check an isolated line segment to see if the fault has been removed before reclosing an open circuit breaker. With reference now to FIG. 5 and FIG. 6, the fault protection system 510 can comprise a controller 560 and a probe power unit 550, 650. In an example embodiment, probe power unit 550/650 can be configured to determine if the fault persists for that segment. In another example embodiment, probe power unit 550/650 can be configured to determine if the fault persists for that segment, and if so, determine the location of the fault on the segment. The fault protection system can be configured to determine if line-to-ground or line-to-line faults persist before allowing a circuit breaker to reclose.

Probe power unit 550 can be connected, for example, to the microgrid 500. In one embodiment, probe power unit 550 can be connected between microgrid 500 and a ground. In another embodiment, probe power unit 550 can be connected between lines of microgrid 500 (not shown). In an example embodiment, a probe power unit is associated with a node of a low voltage DC bus microgrid system. In other words, each probe power unit can be associated, in an example embodiment, with a node for each connected source/load/storage device. In an example embodiment, a probe power unit can be associated with the set of switches. In an example embodiment, the probe power unit is connected to the microgrid near one of the switches of the set of switches.

In an example embodiment, probe power unit 650 can be located between ground and the microgrid. Probe power unit 650 can comprise a probe capacitor 651, a probe inductor 652, a power source 655, a resistor Rb, and switches 653/654. Probe capacitor 651 can be connected between ground and probe inductor 652. A microgrid connecting switch 653 can be connected between probe inductor 652 and the microgrid. Power source 655 can be connected in parallel with probe capacitor 651. Power source 655 can be configured to inject a probe power pulse to the microgrid. For example, probe power unit 650 can be connected to a segment of the microgrid by closing microgrid connecting switch 653 and probe switch 654 can close then open (toggle between open and closed) to inject a probe power pulse to the segment. Probe power unit 650 can be configured to be selectively connected to the microgrid through microgrid connecting switch 653. Moreover, probe power unit 650 can comprise any suitable components configured to apply a probe power supply to the microgrid to test whether and/or where a fault exists.

In an example embodiment, after a fault is detected and the associated circuit breakers have opened switches isolating the fault on a segment of the microgrid, probe power unit 650 can be selectively connected to the segment on the microgrid. If a fault still exists, power will discharge from probe capacitor 651 and probe inductor 652 through microgrid connecting switch 653. In an example embodiment, a sensor, e.g., sensor 551, can determine if and how the probe power unit is discharging. For example, the sensor can be a current sensor. In another example embodiment, the current sensor may be configured, for example, to sense the current flowing in the line connecting the probe power unit to the microgrid. In another example embodiment, the current sensor may be configured, for example, to sense the current flowing in the isolated segment. In another example, the sensor can be a voltage sensor. The voltage sensor may be configured, for example, to sense the voltage across the probe capacitor. Moreover, any suitable sensor or method may be used to determine and/or quantify the discharging of probe power unit 550.

Figure 8:
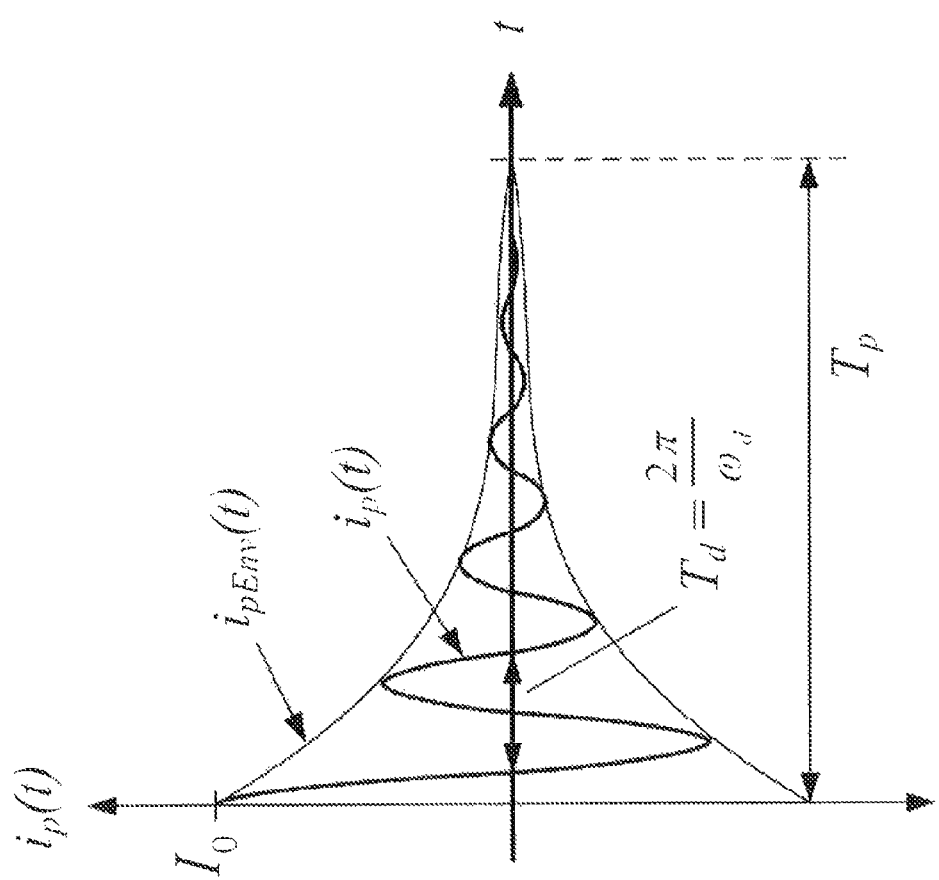
FIG. 8 illustrates an example probe power unit current waveform.

The probe capacitor and inductor facilitates a finite, oscillating, and quickly diminishing probe current in the event that there is a fault still in existence in the segment. With momentary reference to FIG. 8, an example probe current waveform is provided, where $I_0$ is the initial current in the probe circuit; $i_p$ is the instantaneous probe current, $i_{pEnv}$ is the probe current envelope; and $T_p$ is the probing period. The waveform can comprise a rapid decay.

The discharge of probe power unit 550 can, in an example embodiment, be characterized to provide further information about the fault and its location. For example, the location of the fault on the line attached to the probe can be determined. In other words, the frequency and the rate of decay of the probe current from the probe power unit can be used to calculate the distance from the probe to the fault and the fault resistance, respectively. In an example embodiment, the distance from the probe to the fault can be calculated by the following formula:

$$d = \frac{1 - 4\pi^2 f_{ip}^2 L_P C_P}{4\pi^2 f_{ip}^2 L_u C_P}$$

wherein $L_P$ is the probe inductance, $C_P$ is the probe capacitance, $L_u$ is the line inductance, and $f_{ip}$ is the damped resonance frequency, which is approximately $1/(2\pi\sqrt{(L_1+L_P)C_P})$, where $L_1$ is the inductance of the faulted segment. Furthermore, $L_P$ and $C_P$ can be determined as follows:

$$L_P = \frac{R}{2} \frac{T_p}{\ln(\sqrt{KV_0})} - L_u * l$$

$$C_P = (L_P + L_v l)K$$

$$K = \frac{4\zeta^2}{R^2}$$

wherein Tp is the probing period, Lu is the inductance of the unit length of cable, K is the damping coefficient, l is the distance between the switches, $V_0$ is initial probe capacitor voltage, and R is the sum of the cable and fault resistances.

Furthermore, in various embodiments, the fault resistance can be identified using an envelope waveform resulting from extracting peak points of probe current sampling. The upper envelope of the current can be determined as follows:

$$i_p\text{Env}(t) = I_{pk} e^{-\alpha t}$$

where Ipk is the peak of the current envelope. The attenuation and the fault resistance can be computed as follows:

$$\alpha = -\frac{\ln(l_{pEnv}[n]) - \ln(l_p Env[n-1])}{t[n] - t[n-1]}$$

After the attenuation is identified, the fault resistance can be calculated as follows:

$$R_f = d(2\alpha L - R_u)$$

The size of the probe capacitor or charge placed up on it may be suitably determined to facilitate the intended purposes. For example, the size of the probe capacitor or charge placed upon it may be dependent on the length of the line between nodes, resistance in the microgrid, and desirable probe current characteristics, etc. In an example embodiment, however, the charge on the probe capacitor is configured such that in a fault condition the connected probe discharges significantly smaller current than would flow if the circuit breaker were closed to test the existence of the fault. In this way, it is much less likely that current flowing due to a still existing fault will damage any connected devices.

In an example embodiment, the probe power unit receives a signal from the probe power unit sensor, e.g., sensor 551, and determines (a) whether a fault still exists on the segment, and optionally also determines (b) the location of the fault on the segment and (c) the fault resistance. These determinations can be made as disclosed herein. In one example embodiment, probe power unit is a stand alone device. In this embodiment, a probe power unit can be added at each desired node. In this embodiment, probe power unit 550 can be configured to communicate with controller 560, for example, to signal controller 560 whether the fault has been cleared and it is appropriate to reclose the switches to reconnect the segment. In another example embodiment, probe power unit 550 can be an integral part of controller 560.

In an example embodiment, the system and method for fault protection facilitates the conservation of energy. Firstly, this system and method for fault protection can facilitate the reduction of reserved power (i.e., generator capacity, or number of generators) to handle the reclosure failure. This may be especially true in a weak power system. A weak power system can demand quite a lot of reserved (extra) power to avoid serious system disturbances or even a failure from a high power demand from a fault. This high power demand may only be for a very short period, but the fault can draw a large amount of power from the generator(s). Thus, reducing the reclosure fault may facilitate a safe reduction of reserved power. In addition, the system and method may conserve power that might otherwise be lost due to faults during reclosure.

Probe power unit 550 can be controlled by an Intelligent Electrical Device (IED) 560 as the controller. In one example embodiment, the IED can be a single controller for the system. In another example embodiment, an IED may be provided for each node/for each probe power unit. The IED can be configured to control the switches of the probe power unit to control the charging of the probe capacitor and/or connecting it to the microgrid. In another example embodiment, the IED can receive input from the sensor(s) to provide information to the IED about the discharging of the probe capacitor or other fault information. The IEDs may be configured to communicate information from probe power unit 550 to a master controller or to the other IEDs.

Although the various concepts described herein are described in the context of a low voltage DC bus microgrid system, these concepts can have broader applicability. For example, the fault detection and fault isolation systems, devices, and methods disclosed herein can be used in connection with any suitable DC power distribution systems. Thus, the controller and the bus switches and freewheeling switches described herein may be useful in both low voltage and high voltage DC systems. Moreover, the bus can be any suitable type of electrical bus, for example, a loop type bus, radial type bus, mesh type bus, and/or the like.

Moreover, the probe power unit and related systems, devices and methods described herein can be configured to be applied to traditional power systems, including all AC, DC, HV, or LV microgrid or macrogrid systems. Therefore, at least in the context of the probe power unit, the system described herein should be considered to be as broad as AC or DC, HV or LV, and microgrid or macrogrid. For example, the methods disclosed herein can be of interest to protective relay companies because this can significantly reduce the chance of circuit breaker reclosing failure and in turn the burden on generators. The power companies spend a lot of money to deal with the reclosing failure.

Thus, the fault persistence and location disclosure herein is not limited to DC embodiments. In various embodiments, a fault protection system for use in an AC or DC bus system can comprise energy sources, energy loads, and energy storage (each a distributed element and collectively distributed elements), all in an AC or DC power transmission or distribution system, wherein a first element is connected to the system at a first node, wherein a second element is connected to the system at a second node, wherein a portion of the system between the first node and the second node is a segment, the fault protection system comprising: a controller configured to detect a fault in the segment and to isolate the segment; and a probe power unit configured to determine, while the segment is isolated, if the fault still exists, wherein the probe power unit is configured to be selectively connected to the segment while the segment is isolated, and wherein the controller is configured to reconnect the segment to the system based on information from the probe power unit indicating that the fault does not exist.

Figure 7:
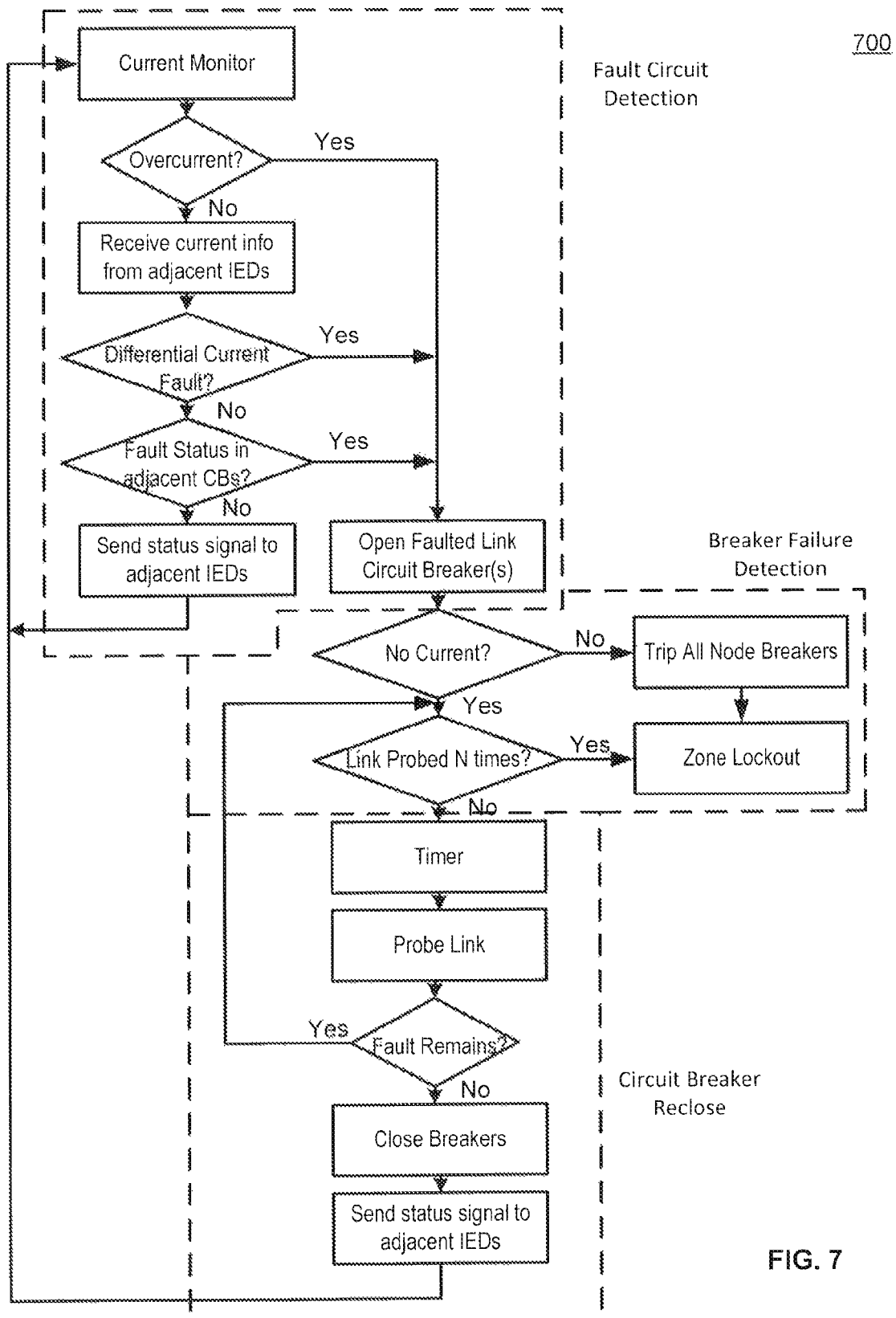
FIG. 7 illustrates an example protection algorithm.

In an example embodiment, and with reference to FIG. 7, an example algorithm for sensing a fault in a segment of a microgrid, isolating the segment, and determining safe conditions for reconnecting the segment to the microgrid. In an example embodiment, a current monitor checks for overcurrent. A controller is configured to check for differential current on a segment. In the event of overcurrent, differential current on a segment, or a fault in an adjacent segment, the controller is configured to open the circuit breaker(s) to disconnect the segment. From there, the algorithm can probe the disconnected segment N times to see if the segment (or link) is still has the fault condition. After N times being probed, the circuit breakers for that segment can be locked out if the fault still remains. The locked out circuit breakers can, for example, be reconnected manually. In an example embodiment, if the probe detects that the fault no longer remains, the breakers can be closed and/or adjacent controllers can be informed by a status signal that the segment has been reconnected.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the draft statements. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed:

1. A fault protection system for use in a DC bus system ("system"), the system further comprising energy sources, energy loads, and energy storage (each a distributed element and collectively distributed elements), all in a DC power transmission or distribution system, wherein a first element is connected to a system at a first node, wherein a second element is connected to the system at a second node, wherein a portion of the system between the first node and the second node is a segment, the fault protection system comprising:
   a fault detection system configured to detect a fault in the segment;
   a controller system configured to control switches to isolate the segment, wherein the switches are bus switches and freewheeling switches; wherein isolating the segment does not disconnect multiple distributed elements from the system, wherein the controller system further comprises a master controller, a first sensor, and a second sensor, wherein the first sensor is configured to measure the current in the segment at a first end of the segment, wherein the second sensor is configured to measure the current in the segment at a second end of the segment opposite the first end of the segment, and wherein the master controller is configured to detect a fault on the segment by comparing the measured current from the first sensor with the measured current from the second sensor; and
   a first slave controller and a second slave controller;
   wherein the first slave controller is configured to receive a first signal from the first sensor, pass the first signal to the master controller, receive switching instructions from the master controller, and control one or more of the bus switches and freewheeling switches;
   wherein the second slave controller is configured to receive a second signal from the second sensor, pass the second signal to the master controller, receive switching instructions from the master controller, and control one or more of the bus and freewheeling switches; and
   wherein the master controller is configured to receive the first and second signals from the first and second slave controllers respectively and to compare the first and second signals, and wherein the master controller is configured to command the slave controllers to switch various switches if a difference exists between the first and second signals.

2. A fault protection system for use in a DC bus system ("system"), the system further comprising energy sources, energy loads, and energy storage (each a distributed element and collectively distributed elements), all in a DC power transmission or distribution system, wherein a first element is connected to a system at a first node, wherein a second element is connected to the system at a second node, wherein a portion of the system between the first node and the second node is a segment, comprising:

a fault detection system configured to detect a fault in the segment; and a controller system configured to control switches to isolate the segment, wherein the switches are bus switches and freewheeling switches; wherein isolating the segment does not disconnect multiple distributed elements from the system;

wherein at least one of the energy sources and energy storage are configured for bi-directional energy flow, wherein the bus switches are bi-directional switches, and wherein the freewheeling switches are uncontrolled uni-directional switches or controlled bi-directional switches.

3. The fault protection system of claim 2, wherein the DC bus system is a low voltage DC bus microgrid, and wherein the DC power transmission or distribution system is a loop type energy DC power transmission or distribution system.

4. The fault protection system of claim 2, further comprising:

first and second slave controllers;

a first sensor and a second sensor;

wherein the first sensor is configured to measure the current in the segment at a first end of the segment;

wherein the second sensor is configured to measure the current in the segment at a second end of the segment opposite the first end of the segment;

wherein the first and second slave controllers are configured to communicate with each other and are configured to detect a fault on the segment by comparing the measured current from the first sensor with the measured current from the second sensor; and wherein the first and second slave controllers are configured to control one or more of the bus and freewheeling switches.

5. A fault protection system for use in a DC bus system ("system"), the system further comprising energy sources, energy loads, and energy storage (each a distributed element and collectively distributed elements), all in a DC power transmission or distribution system, wherein a first element is connected to a system at a first node, wherein a second element is connected to the system at a second node, wherein a portion of the system between the first node and the second node is a segment, the fault protection system comprising:

a fault detection system configured to detect a fault in the segment;

a controller system configured to control switches to isolate the segment, wherein the switches are bus switches and freewheeling switches; wherein isolating the segment does not disconnect multiple distributed elements from the system;

a probe power unit that is configured to be selectively connected between a ground and the system;

wherein the probe power unit comprises:

a probe capacitor that is connected between the ground and a probe inductor;

a power source connected in parallel with the probe capacitor;

a grid connecting switch connected between the probe inductor and a grid;

wherein the power source is configured to inject the probe power when the probe power unit is connected to the grid, and wherein the probe power unit is configured to determine whether fault conditions continue to exist in the segment while the segment is disconnected from the grid, wherein the controller system is configured to reconnect the segment to the grid if the probe power unit indicates that the fault condition does not exist, and wherein the probe power unit is configured to be selectively connected to the grid through the grid connecting switch.

6. The fault protection system of claim 5, wherein the probe power unit is configured to determine at least one of the location of the fault and a fault resistance based on the power discharging from the probe capacitor when connected to the grid.

7. A method of detecting and handling faults in a DC bus system ("system"), the system further comprising energy sources, energy loads, and energy storage (each a distributed element and collectively distributed elements), all in a DC power transmission or distribution system, wherein a first element is connected to the system at a first node, wherein a second element is connected to the system at a second node, wherein a portion of the system between the first node and the second node is a segment, the method comprising:

detecting a fault in the segment;

isolating the segment from the system;

waiting for a period of time;

connecting a probe power unit to the system at the isolated segment; and determining if a fault still exists on the isolated segment, wherein the determining is based on whether power is discharging from the probe power unit when connected to the system.

8. The method of claim 7, wherein a controller is configured to control switches to isolate the faulted segment of the system.

9. The method of claim 7, wherein the determining is based on current flowing from the probe power unit or voltage on a probe capacitor.

10. The method of claim 7, wherein isolating the segment comprises commanding bus switches open and commanding freewheeling switches closed.

11. A fault protection system for use in a DC bus system ("system"), the system further comprising energy sources, energy loads, and energy storage (each a distributed element and collectively distributed elements), all in a DC power transmission or distribution system, wherein a first element is connected to the system at a first node, wherein a second element is connected to the system at a second node, wherein a portion of the system between the first node and the second node is a segment, the fault protection system comprising:

a controller configured to detect a fault in the segment and to isolate the segment; and a probe power unit configured to determine, while the segment is isolated, if the fault still exists, wherein the probe power unit is configured to be selectively connected to the segment while the segment is isolated, and wherein the controller is configured to reconnect the segment to the system based on information from the probe power unit indicating that the fault does not exist.

12. The fault protection system of claim 11, further comprising bus switches and freewheeling switches, associated with the segment, and wherein isolating the segment does not disconnect multiple distributed elements from the system.

13. The fault protection system of claim 11, wherein the probe power unit is further configured to determine at least one of the location of the fault and a fault resistance, on the isolated segment, based on the power discharging from a probe capacitor when connected to the system.

14. The fault protection system of claim 11, further comprising a sensor configured to sense the current flowing from or the voltage on the probe power unit, wherein a signal from the sensor is the basis for determining if a fault still exists on the segment and a location of the fault.

15. The fault protection system of claim 11, wherein isolating the segment comprises commanding bus switches open and commanding freewheeling switches closed.

16. The fault protection system of claim 15, wherein the distributed elements are configured for bi-directional energy flow, and wherein the bus switches and the freewheeling switches are bi-directional switches.

17. The fault protection system of claim 15, further comprising:
- a first sensor, and a second sensor, wherein the first sensor is configured to measure the current in the segment at a first end of the segment, wherein the second sensor is configured to measure the current in the segment at a second end of the segment opposite the first end of the segment; and wherein the controller is configured to detect a fault on the segment by comparing the measured current from first sensor with the measured current from the second sensor;
- wherein the controller is configured to receive a first signal from the first sensor and a second signal from the second sensor, compare the first signal and second signal and to control one or more of the bus and freewheeling switches based on the comparison of the first signal and the second signal.

* * * * *